United States Patent [19]

Kawabata et al.

[11] Patent Number: 5,502,508
[45] Date of Patent: Mar. 26, 1996

[54] GRADATION COMPENSATING APPARATUS FOR A VIDEO SIGNAL

[75] Inventors: Minoru Kawabata, Sakai; Atsuhisa Kageyama, Ibaraki, both of Japan

[73] Assignee: Matsushita Electric Industrial Co., Ltd., Osaka, Japan

[21] Appl. No.: 268,302

[22] Filed: Jun. 30, 1994

[30] Foreign Application Priority Data

Jul. 28, 1993 [JP] Japan .................... 5-186051

[51] Int. Cl.⁶ .................... H04N 9/64; H04N 5/20
[52] U.S. Cl. .................... 348/652; 348/712; 348/713; 348/692
[58] Field of Search .................... 348/645, 652, 348/673, 674, 675, 686, 687, 691, 692, 712, 713; 358/520; H04N 5/20, 5/66, 9/64, 9/68, 9/72

[56] References Cited

U.S. PATENT DOCUMENTS

| | | |
|---|---|---|
| 3,760,099 | 9/1973 | Kong . |
| 4,369,466 | 1/1983 | Matsuzaki et al. .................... 348/691 |
| 5,351,141 | 9/1994 | Tsuji et al. .................... 358/520 |

FOREIGN PATENT DOCUMENTS

| | | |
|---|---|---|
| 460595 | 12/1991 | European Pat. Off. . |
| 2-107092 | 4/1990 | Japan . |
| 2-192286 | 7/1990 | Japan . |
| 3-135290 | 6/1991 | Japan . |
| 4-77179 | 3/1992 | Japan . |
| 4-150171 | 5/1992 | Japan . |
| 4-229788 | 8/1992 | Japan . |
| 91-06180 | 5/1991 | WIPO . |

*Primary Examiner*—James J. Groody
*Assistant Examiner*—Glenton B. Burgess
*Attorney, Agent, or Firm*—Ratner & Prestia

[57] ABSTRACT

A gradation compensating apparatus comprises a skin color detecting circuit for detecting a skin color signal from an inputted color difference signal, a compensation amount controlling circuit for controlling the signal level by the skin color detecting signal as a compensating signal, an APL detecting circuit for detecting an APL level from an inputted luminance signal and for outputting the detected APL level as an APL voltage, an APL controlling circuit for controlling the compensating signal level by the APL voltage, an output circuit for outputting a compensating output voltage by controlling the compensating signal with an inputted dc voltage, and a CRT driving circuit for controlling the brightness of the picture by using the compensating output voltage as a cutoff reference voltage.

8 Claims, 5 Drawing Sheets

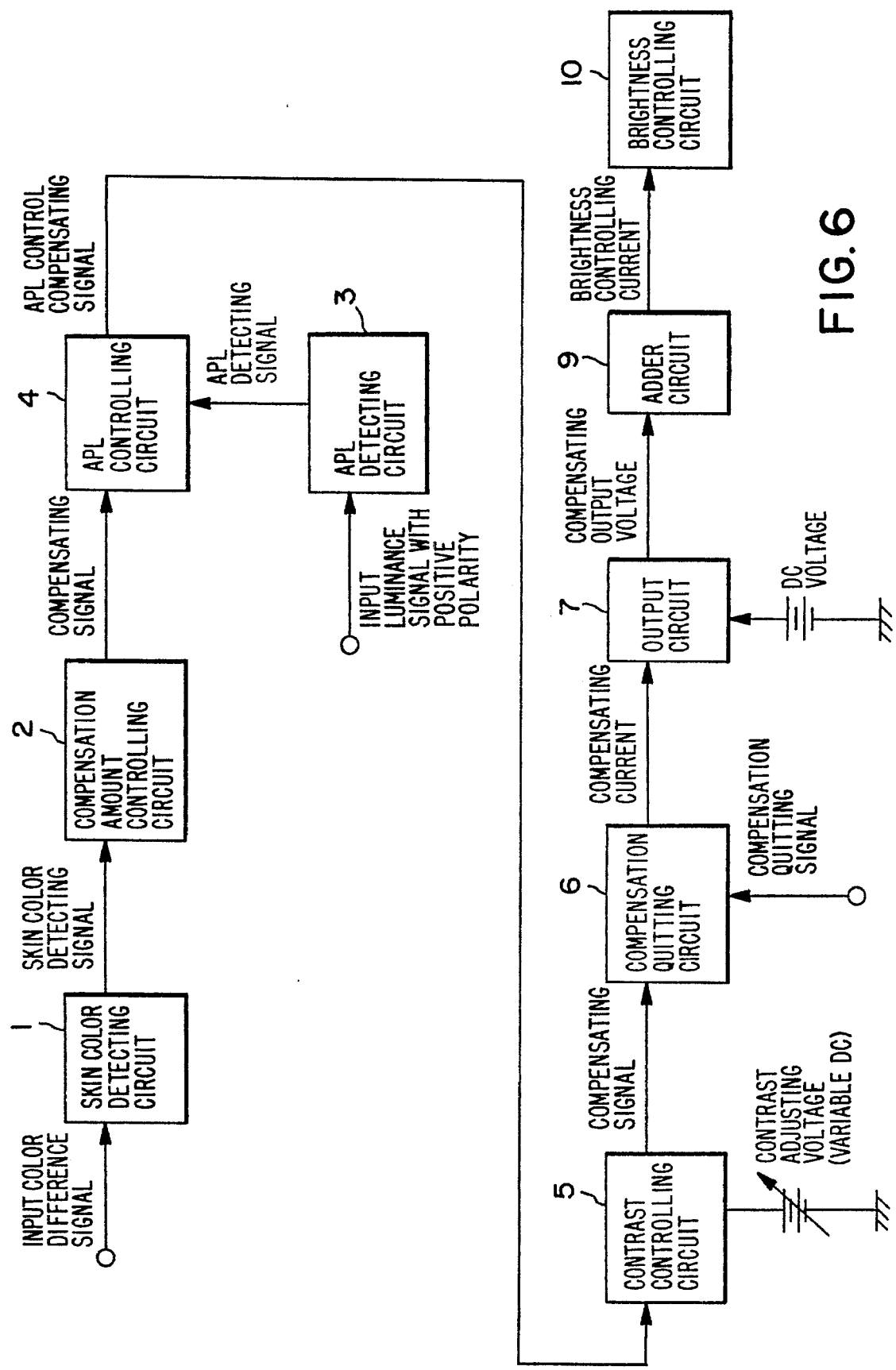

GRADATION COMPENSATING APPARATUS FOR A VIDEO SIGNAL

BACKGROUND OF THE INVENTION (1) Field of the Invention

The present invention relates to a gradation compensating apparatus for a video signal for improving a television picture quality.

(2) Description of the Prior Art

Recently, gradation compensating apparatus for video signals have been recognized as being important for realizing high picture quality. Specifically, high picture quality is realized by preventing picture suppression and black level buoying. As a result, by improving the picture gradation, the devices have been found to be useful for large color television receivers and for applications where high picture quality is required.

FIG. 1 shows input-output characteristic curves of a black level compensating circuit of a gradation compensating apparatus for a video signal in accordance with the prior art. The abscissa is an input voltage level and the ordinate is an output voltage level. The abscissa marked 1 shows an input voltage level corresponding to the minimum brightness level and the range marked 2 shows an input voltage level corresponding to the brightness of a skin color portion of the input video signal. The curve 3 shows an input-output characteristic without compensation and the output voltage level is proportional to the input voltage level. The curve 4 shows a characteristic with compensation.

In the characteristics of the black level compensating circuit shown in FIG. 1, when the minimum brightness level is as marked by 1, the picture appears as if its black level is buoyant. In order to improve the picture gradation, the minimum brightness level is lowered to a level which is lower than that of the input and there is no level drift due to black level compensation. The slant of the characteristic curve 3 without compensation is made steep and the input voltage level of the minimum brightness level is compensated to approach the pedestal level. Thus, the gradation of the black portion is improved. The higher the average picture level (APL) is, the stronger the compensation is controlled.

However, because only the brightness signal is compensated, as a result, the balance between the color signal and the brightness signal deteriorates. This creates a problem in that the color red and the color of skin become dull. These are colors which are highly sensitive to the human eye, especially in a high APL picture.

SUMMARY OF THE INVENTION

A gradation compensating apparatus for a video signal of the present invention comprises a skin color detecting circuit, a compensation amount control circuit, an APL detecting circuit, an APL controlling circuit, a contrast controlling circuit, a compensation quitting circuit, and an output circuit.

In the above-mentioned configuration, the skin color portion of the video signal is detected from the input color difference signal at the skin color detecting circuit and then the level is adjusted at the compensation amount controlling circuit to employ the skin color detecting signal as a compensating signal. On the other hand, the APL level is detected from the input luminance signal at the APL detecting circuit, and the APL voltage is outputted from the APL detecting circuit. The compensating signal level is adjusted according to the APL voltage at the APL controlling circuit. In this manner, the compensation is increased for a picture which has a high APL level and a skin color which is easy to dull. In order to link the compensation amount to the brightness level control by user contrast control, the compensating signal level is controlled at the contrast controlling circuit by using a contrast adjusting voltage. After that, the compensation is stopped for the letter portion to display on the screen at the compensation quitting circuit. Also, the compensating output voltage is obtained at the output circuit, and the compensation is excuted by using this compensating output voltage. Thus, by increasing the brightness of a skin color portion having a high APL level in the video signal, skin color dullness can be suppressed.

BRIEF DESCRIPTION OF THE DRAWINGS

FIG. 6 is a block diagram of a gradation compensating apparatus in accordance with still another embodiment of the present invention.

DESCRIPTION OF THE PREFERRED EMBODIMENTS

Figure 1:
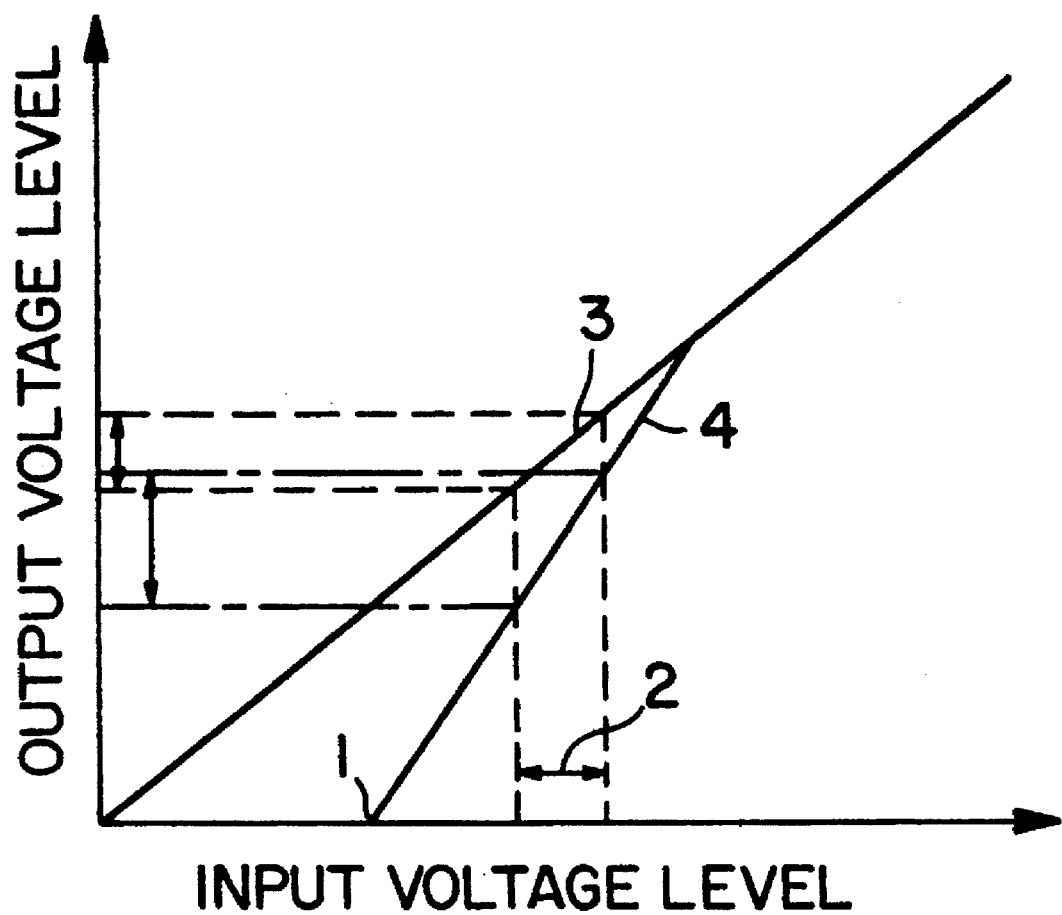
FIG. 1 shows input-output characteristic curves of a black level compensating circuit, which is an example of a gradation compensating apparatus for a video signal in accordance with the prior art.
Figure 2:
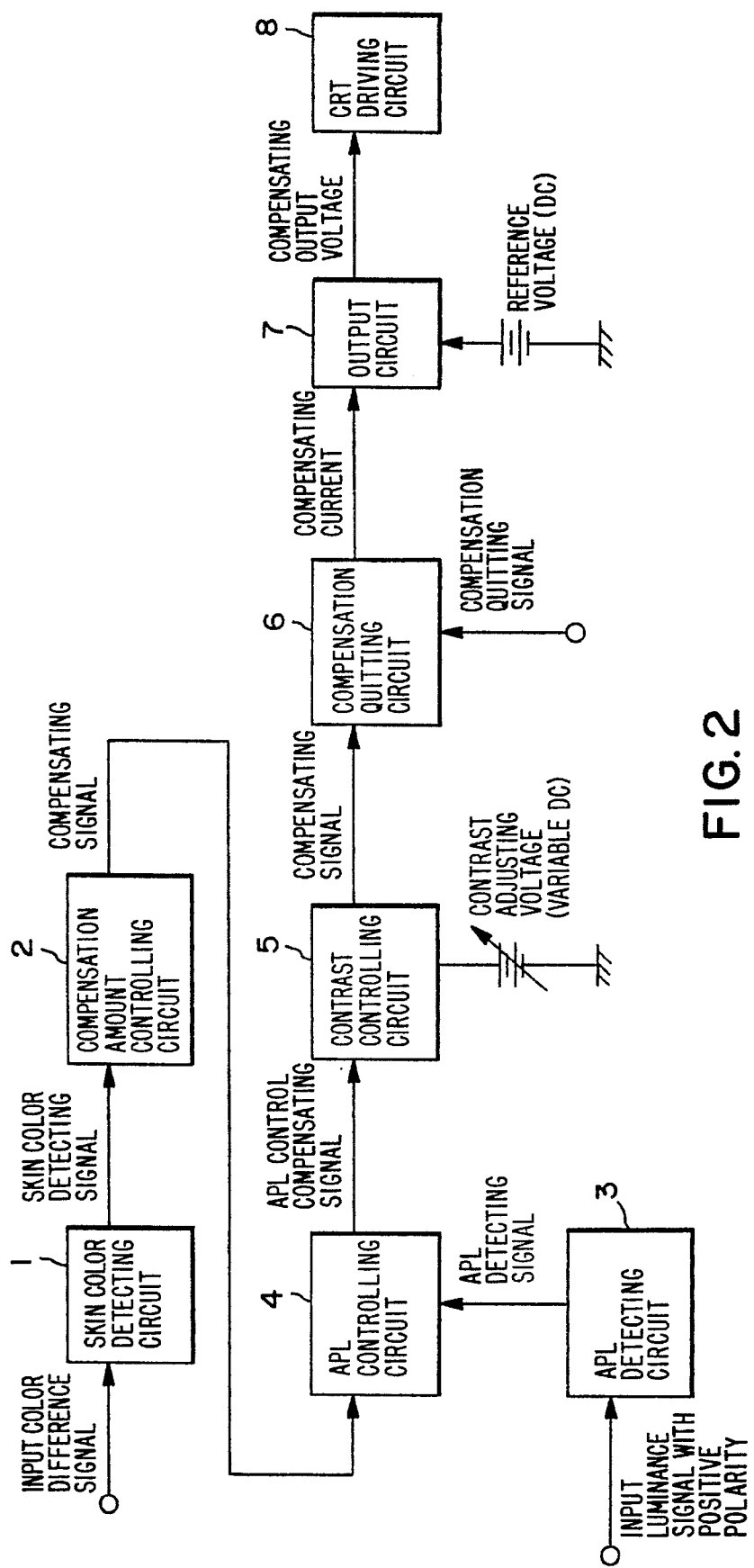
FIG. 2 is a block diagram of a gradation compensating apparatus for a video signal in accordance with a preferred embodiment of the present invention.

FIG. 2 is a block diagram of a gradation compensating apparatus for a video signal in accordance with a preferred embodiment of the present invention. A skin color detecting circuit 1 detects a signal from a skin color portion of an input color difference signal a. A compensation amount controlling circuit 2 adjusts the level of the skin color detecting signal which is detected at the skin color detecting circuit 1 and outputs it as a compensating signal. An APL circuit 3 detects an APL level from the input luminance signal b. An APL controlling circuit 4 adjusts the level of the compensating signal d by using the APL detecting voltage e detected at the APL detecting circuit 3 and outputs APL control compensating signal f. A contrast controlling circuit 5 adjusts the level of the compensating signal d by using the contrast adjusting voltage g (variable dc voltage) and outputs a compensating signal i.

A compensating quitting circuit 6 quits compensation action for a letter displaying portion on the screen. An output circuit 7 controls the inputted dc reference voltage 1 based on the compensating current j outputted from the compensation quitting circuit 6 and outputs a compensating output voltage k. A CRT driving circuit 8 increases the skin color brightness on the screen by using the compensating output voltage k outputted from the output circuit 7 as a cutoff reference voltage. Thus, when the cutoff reference voltage is reduced, the picture brightness increases.

Figure 3:
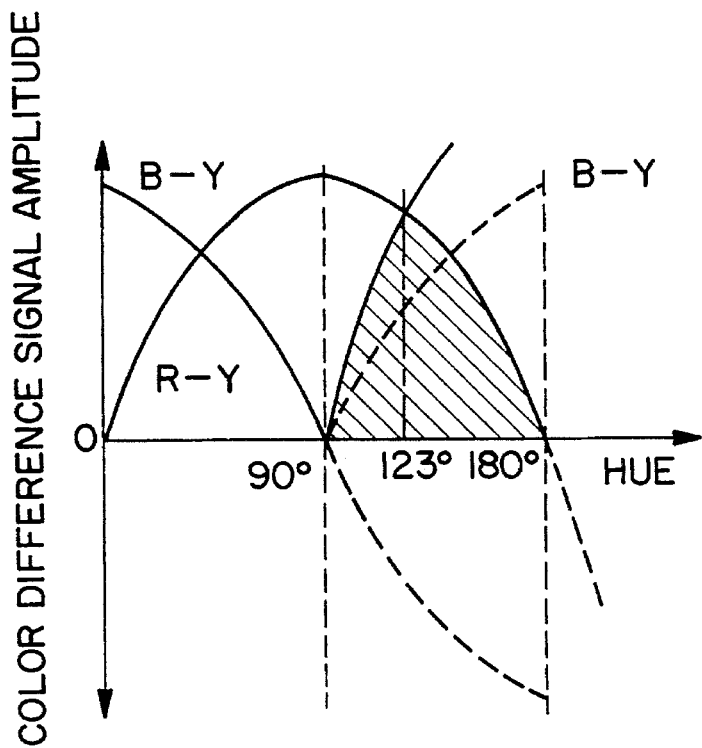
FIG. 3 shows a characteristic curve of a skin color detecting circuit in a gradation compensating apparatus shown in FIG. 2 in accordance with the preferred embodiment of the present invention.

FIG. 3 shows a characteristic curve of a skin color detecting circuit 1 which detects the skin color portion of the input color difference signal. The skin color detecting circuit 1 detects the minimum value of the positive side of the reverse waveform of the color difference signal (B-Y) and the minimum value of the positive side waveform of the color difference signal (R-Y). The amplitude of the color difference signal (R-Y) is controlled so that the detection characteristic becomes maximum at the skin color hue, namely 123 degrees. Because the skin color detecting signal c is used as a compensating signal as it is, the amplitude of the signal is limited near the saturation point of the skin color to prevent excessive compensation when the highly saturated signal is inputted. The amplitude of the signal which is detected is adjusted to the value which is optimum for compensation at the compensation amount controlling circuit 2.

Figure 4:
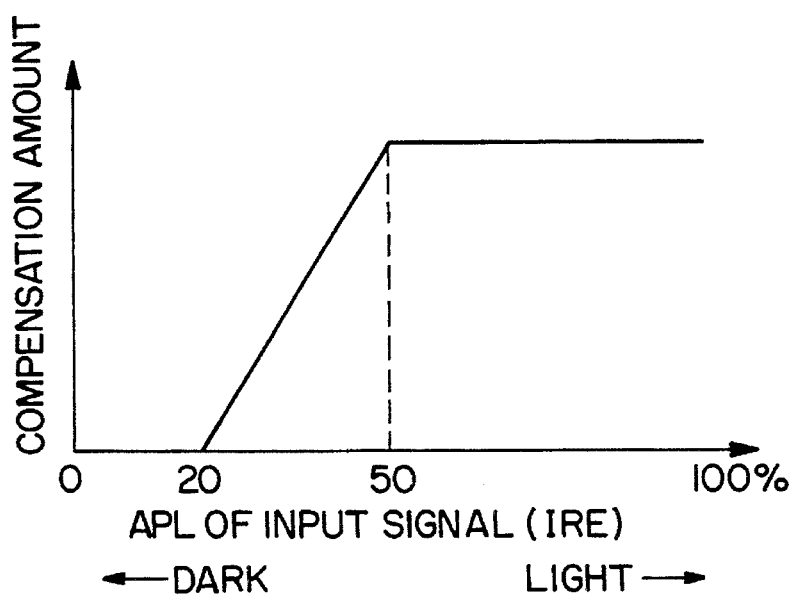
FIG. 4 shows a characteristic curve of an APL control circuit in a gradation compensating apparatus shown in FIG. 2 in accordance with the preferred embodiment of the present invention.

At the APL detecting circuit 3, the average picture level (APL) of the picture is detected from the input luminance signal b and the APL voltage e is outputted. Because skin color dullness is likely to occur at a high APL picture, at the APL controlling circuit 4, the compensating signal d is controlled using the inputted APL detecting signal e so that the compensation does not occur for a dark picture and does occur for a light picture as shown in FIG. 4. In this gradation compensating apparatus, because the compensating signal is outputted to the CRT driving circuit 8, the compensating signal is independent of various kinds of picture controllers. Therefore, because the compensation amount, i.e. the brightness increment of the skin color, is constant even when the contrast is decreased and the brightness level is decreased, it is possible that the skin color gets whitish and the gradation deteriorates. Accordingly, the contrast and the compensation amount are linked together at the contrast controlling circuit 5 using a contrast adjusting voltage g.

The information letters displayed on the screen by a microcomputer for channel selection are also compensated and brightness nonuniformity occurs in the displayed letters. Therefore, the compensation quitting circuit 6 quits the compensation at the information letter portion, by using a compensation quitting signal h which contains information as to whether there are information letters on the screen, and outputs a compensating current j. The output circuit 7 controls the compensating current j by the reference voltage 1 and outputs a compensating output voltage k. The CRT driving circuit 8 lowers each cutoff voltage of the R, G, and B guns only for the skin color portion by using the compensating output voltage k as a cutoff reference voltage, and increases the brightness of the skin color in the picture. As a result, the dullness of the skin color is improved.

According to the preferred embodiment of the present invention, a gradation compensating apparatus can improve dullness of the skin color, by controlling the signal detected at the skin color detecting circuit 1, at the compensation amount controlling circuit 2, the APL controlling circuit 4, the contrast controlling circuit 5, and the compensation quitting circuit 6, and by outputting the compensating output voltage k from the output circuit 7 to the CRT driving circuit 8.

Figure 5:
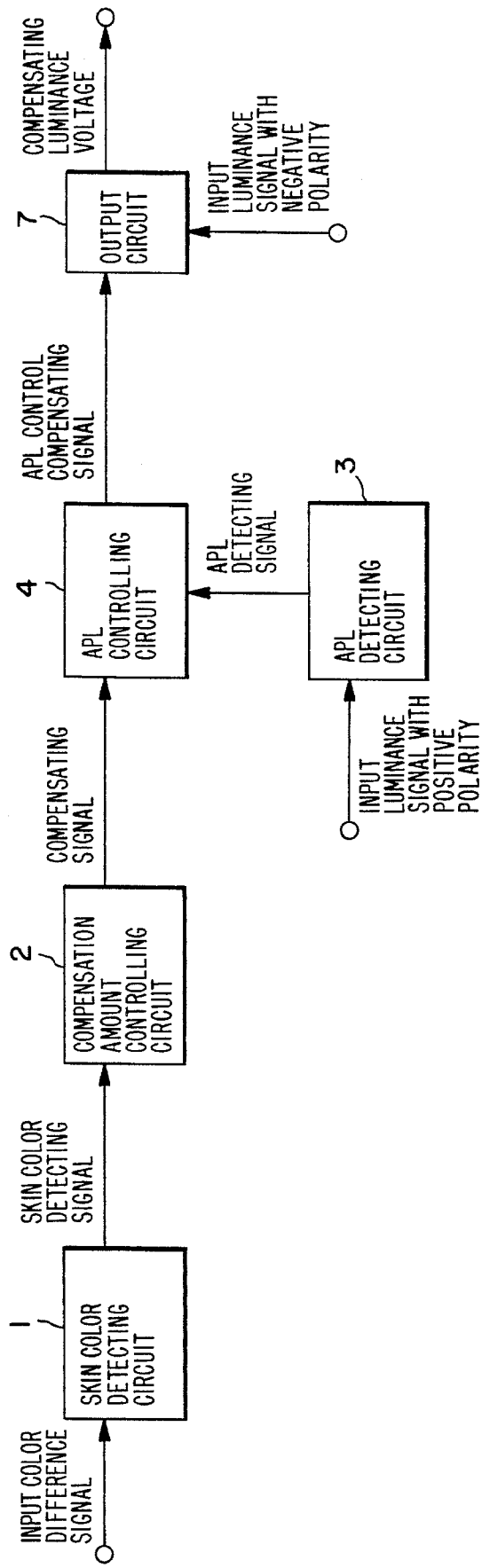
FIG. 5 shows a block diagram of a gradation compensating apparatus in accordance with another embodiment of the present invention.

FIG. 5 is a block diagram of a gradation compensating apparatus for a video signal in accordance with another embodiment of the present invention.

The circuits from the skin color detecting circuit 1 to the APL controlling circuit 4 are similar to those in the first preferred embodiment. The output circuit 7 compensates the input luminance signal b by using the APL control compensating signal f outputted from the APL controlling circuit 4.

The output circuit 7 executes a compensation process by controlling the input luminance signal q with negative polarity (positive sync) by the APL control compensating signal f outputted from the APL controlling circuit 4 and by outputting a compensating luminance voltage m. Because the output circuit 7 inverts the polarity of the APL control compensating signal f, and controls the input luminance signal q, and outputs the compensating luminance voltage m, when the luminance signal with negative polarity is inputted, the signal level for the skin color portion only is increased by the compensating signal f. Thus, the brightness of the skin color portion in the picture is increased, and the dullness of skin color is improved.

According to the second embodiment, by controlling the skin color detecting signal c detected by the skin color detecting circuit 1 at the compensation amount controlling circuit 2 and the APL controlling circuit 4, and by increasing the signal level of the skin color portion of the input luminance signal b with positive polarity and by outputting it, a gradation compensating apparatus for a video signal can be presented with increased brightness for the skin color portion and improved dullness of the skin color.

FIG. 6 is a block diagram of a gradation compensating apparatus for a video signal in accordance with still another preferred embodiment of the present invention.

The circuits from the skin color detecting circuit 1 to the compensation quitting circuit 6 are similar to those in the first preferred embodiment. The output circuit 7 controls the compensating current j outputted from the compensation quitting circuit 6 by a dc voltage n, executes a compensation process and outputs a compensation output signal v.

The output circuit 7 controls the compensating current j outputted from the compensation quitting circuit 6 by the dc voltage n and outputs the compensating output voltage o. By inputting the compensation output signal o to an adder circuit 9, by outputting the brightness controlling current p, and by controlling the user adjusting value of a brightness controlling circuit 10 by the brightness controlling current p, the brightness of the skin color portion is increased and the dullness of the skin color is improved in the picture.

According to a third embodiment, by controlling the skin color detecting signal c detected at the skin color detecting circuit 1 through the compensation amount controlling circuit 2, the APL controlling circuit 4, the contrast controlling circuit 5, and the compensation quitting circuit 6, and by varying the brightness through the output circuit 7, the adder circuit 9, and the brightness controlling circuit 10, a gradation compensating apparatus can be presented with improved dullness of the skin color.

Although a color difference signal is used as an input signal in the skin color detecting circuit 1, a carrier chrominance signal can be also used instead of the color difference signal.

The invention may be embodied in other specific form without departing from the spirit or essential characteristics thereof. The present embodiment is therefore to be considered in all respects as illustrative and not restrictive, the scope of the invention being indicated by the appended claims rather than by the foregoing description. All changes which come within the meaning and range of equivalency of the claims are therefore intended to be embraced therein.

What is claimed:

1. A gradation compensating apparatus for a video signal comprising:

skin color detecting means for receiving an input color difference signal, for detecting a skin color portion of said input color difference signal and for outputting a skin color detecting signal;

compensation amount controlling means, responsive to said skin color detecting signal, for generating a first compensating signal for controlling compensation to said skin color;

APL detecting means for receiving an input luminance signal, for detecting an average picture level from said input luminance signal and for outputting an APL detecting signal;

APL controlling means for controlling the level of said first compensating signal responsive to said APL detecting signal and for outputting a second compensating signal;

output means for controlling said second compensating signal responsive to an inputted dc voltage and for outputting a compensating output voltage, and CRT driving means for controlling brightness in a picture corresponding to said video signal by using said second compensating output voltage as a cutoff reference voltage, and wherein;

brightness of the skin color portion in said picture corresponding to said video signal is selectively increased.

2. A gradation compensating apparatus for a video signal comprising:

skin color detecting means for receiving an input color difference signal, for detecting a skin color portion of said input color difference signal and for outputting a skin color detecting signal;

compensation amount controlling means, responsive to said skin color detecting signal for generating a first compensating signal for controlling compensation to said skin color;

APL detecting means for receiving a first input luminance signal, for detecting an average picture level from said first input luminance signal and for outputting an APL detecting signal;

APL controlling means for controlling the level of said first compensating signal responsive to said APL detecting signal and for outputting a second compensating signal; and output means for controlling said second compensating signal responsive to a second input luminance signal and for outputting a compensating luminance voltage;

wherein the brightness of the skin color portion in a picture corresponding to said video signal is selectively increased by increasing the level of only the skin color portion in said first input luminance signal.

3. A gradation compensating apparatus for a video signal comprising:

skin color detecting means for receiving an input color difference signal, for detecting a skin color portion of said input color difference signal and for outputting a skin color detecting signal;

compensation amount controlling means, responsive to said skin color detecting signal for generating a first compensating signal for controlling compensation to said skin color;

APL detecting means for receiving an input luminance signal, for detecting average picture level from said input luminance signal and for outputting an APL detecting signal;

APL controlling means for controlling the level of said first compensating signal responsive to said APL detecting signal and for outputting a second compensating signal;

output means for controlling said second compensating signal responsive to an inputted dc voltage and for outputting a compensating output voltage;

adder means for converting said compensating output voltage to a compensating current and for outputting said compensating current; and a brightness controlling means for adjusting the picture brightness of a picture corresponding to said video signal by a user adjusting value;

wherein the brightness of the skin color portion in said picture is adjusted by controlling the brightness of said picture with said compensating current.

4. A gradation compensating apparatus for a video signal comprising:

skin color detecting means for receiving an input color difference signal, for detecting a skin color portion of said input color difference signal and for outputting a skin color detecting signal;

compensation amount controlling means, responsive to said skin color detecting signal for generating a first compensating signal for controlling compensation to said skin color;

APL detecting means for receiving an input luminance signal, for detecting the average picture level from an input luminance signal and for outputting an APL detecting signal;

APL controlling means for controlling the level of said first compensating signal responsive to said APL detecting signal and for outputting a second compensating signal, and output means for controlling said second compensating signal responsive to an inputted dc voltage and for outputting a compensating output voltage;

wherein variation of contrast and brightness to said skin color in a picture corresponding to said video signal.

5. A gradation compensating apparatus for a video signal in accordance with claim 1, further comprising a compensation termination means for terminating compensation responsive to a compensation quitting signal.

6. A gradation compensating apparatus for a video signal in accordance with claim 2, further comprising:

a compensation termination means for terminating compensation responsive to a compensation quitting signal.

7. A gradation compensating apparatus for a video signal in accordance with claim 3, further comprising:

a compensation termination means for terminating compensation responsive to a compensation quitting signal.

8. A gradation compensating apparatus for a video signal in accordance with claim 4, further comprising:

a compensation termination means for terminating compensation responsive to a compensation quitting signal.

* * * * *